US005702653A

United States Patent [19]

Riley

[11] Patent Number: 5,702,653

[45] Date of Patent: Dec. 30, 1997

[54] THICK-FILM CIRCUIT ELEMENT

[75] Inventor: Richard E. Riley, Riverside, Calif.

[73] Assignee: Spectrol Electronics Corporation, Ontario, Canada

[21] Appl. No.: 500,547

[22] Filed: Jul. 11, 1995

[51] Int. Cl.[6] .............. C04B 33/34

[52] U.S. Cl. .............. 264/61; 264/60; 156/89; 427/96; 427/101; 427/102; 427/125; 428/901

[58] Field of Search .............. 156/89; 264/61, 264/60; 427/96, 101, 102, 125; 428/901

[56] References Cited

U.S. PATENT DOCUMENTS

| | | | |
|---|---|---|---|
| 4,168,344 | 9/1979 | Shapiro et al. | 428/427 |
| 4,289,802 | 9/1981 | Micheli | 427/125 |
| 4,397,915 | 8/1983 | Wahlers et al. | 428/432 |
| 4,771,263 | 9/1988 | Crook et al. | 338/176 |
| 4,824,694 | 4/1989 | Bosze et al. | 427/102 |
| 4,839,775 | 6/1989 | Schnitker et al. | 361/402 |
| 5,024,883 | 6/1991 | SinghDeo et al. | 428/323 |
| 5,039,552 | 8/1991 | Riemer | 427/96 |
| 5,169,465 | 12/1992 | Riley | 156/89 |
| 5,378,408 | 1/1995 | Carroll | 252/514 |

*Primary Examiner*—Patrick Ryan
*Attorney, Agent, or Firm*—Woodard, Emhardt, Naughton Moriarty & McNett

[57] ABSTRACT

A thick-film switch element includes a high-temperature glass frit fused to a non-conductive substrate. A cermet layer having a low-temperature glass matrix is fired in a conventional furnace to sink into the glass frit layer such that the resulting thickness of the switch element layer is approximately equal to the original thickness of the glass frit layer. The wet print thickness of the cermet layer is controlled upon application of the cermet to the glass frit. The glass frit and cermet are fired at a controlled temperature and duration to achieve a fired print thickness of the cermet above the surface of the glass frit having a pre-determined value. In one embodiment, the non-conductive substrate is a metal, such as stainless steel.

1 Claim, 1 Drawing Sheet

THICK-FILM CIRCUIT ELEMENT

BACKGROUND OF THE INVENTION

The invention relates generally to the field of circuit elements which are produced using thick-film technology. More particularly, the invention relates to an improved switch element having good wear characteristics that can be cheaply and reliably produced using known equipment and materials.

Switching and encoding electronic components are prevalent in many industries and products. Sliding electrical contacts interfacing with robust metal terminals have been sufficient for simple switching applications and high electrical loads. However, with the increasing emphasis on electronics in product design, and the concomitant proliferation of complex switching patterns and relatively low electrical loads, the prior sliding contact technology has become ineffective. The increasing technological demands have given rise to printed circuit elements involving etched or deposited conductor patterns on a non-conductive substrate.

Circuit elements comprising pyrolytically deposited films of electrically conductive material on a ceramic substrate are well known in the art. For example, the patent to Wahlers et al., U.S. Pat. No. 4,397,915, discloses a vitreous enamel resistor material which is applied to a ceramic substrate and fired to produce an electrical resistive element. A similar vitreous enamel resistor element as described in U.S. Pat. No. 4,168,344, to Shapiro et al. includes metal particles mixed with a glass frit and fired on a flat ceramic substrate. Likewise, thick-film circuit technology is equally well known, albeit of more recent origin. A variety of electronic circuit elements have been produced using thick-film circuit technology, such as resistors, capacitors, and switches.

More recent advancements in thick-film technology have been in the development of thick-film cermet inks which are applied to a substrate in a specific circuit pattern. The cermet inks typically comprise a metal conductive component within a glass or ceramic matrix. Typically the metals are noble metals such as ruthenium, platinum, gold, rhodium, palladium and silver, as well as oxides of the noble metals.

The use of thick-film cermet inks in the production of resistive elements is thought to minimize contact resistance while maximizing durability, stability, and tarnish resistivity. For example, the patent to Bosze et al., U.S. Pat. No. 4,824,694, describes a resistive element employing a thick-film cermet ink applied to an insulative substrate. The Bosze cermet resistive element attempts to address the problem of increasing tarnish resistance and reducing surface resistivity of the circuit element at the point of contact with a wiper element. The Bosze element accomplishes this function by the use of discrete spaced-apart islands of predominantly conductive material applied to the cermet resistive layer which reduces the contact area against the wiper while maintaining adequate electrical resistance.

The patent to Crook et al., U.S. Pat. No. 4,771,263, represents yet another approach to the production of a variable resistance element which is intended to improve the life of the switch components, namely the variable resistor and the contact wiper. The Crook et al. resistance strip includes a ceramic substrate upon which a high temperature glass layer is applied. A thick-film resistive paste is then applied to the glass substrate to act as the principal resistance strip. A second thick-film ink is then applied over the first ink that acquires a glass-like sheen after firing. The object of the Crook et al. resistance strip is that the resistive elements are applied to a smooth glass base, rather than to a ceramic base, thereby adopting the surface texture of the high-temperature glass layer.

While the foregoing technology has been adequate in the design of thick-film resistors and variable resistance elements, switch elements present a different problem that is not addressed by this prior art technology. More particularly, switch elements typically comprise a conductive strip surrounded by insulating material that must be accessible toga resistive wiper element. As the wiper passes over the strip the switch is triggered. However, in the thick-film switch elements of the prior art, the conductive strip is exposed above the surface of the insulating portion of the element. Thus, as the wiper element passes repeatedly over the resistive strip, the wiper and the resistive strip are gradually worn.

Some switch elements have been produced in which an epoxy filler is applied between etched precious metal conductor strips. The epoxy filler, or other insulating material, is applied to eliminate step height problems between the conductor and the base substrate. Although these types of switch elements have superior wear life and high corrosion resistance, their manufacture is typically too costly to be used in many applications and products.

Consequently, there remains a need in the art for a thick-film electrical switch element that has good contact life, smooth mechanical operation, and satisfactory electrical performance. It is also desirable that this switch element be capable of inexpensive production, preferably using presently available equipment and materials.

SUMMARY OF THE INVENTION

In one embodiment of the invention, a high temperature glass frit is fused to a non-conductive substrate using conventional firing procedures. A cermet comprising a low temperature glass matrix with a noble metal conductor material is applied in a circuit pattern onto the surface of the glass frit. The layers are fired in a conventional furnace until the cermet layer sinks into the glass frit layer, thereby producing a thick-film circuit element on a substrate having a thickness essentially equal to the thickness of the applied glass frit layer.

The firing of the cermet layer is under controlled time and temperature conditions depending upon the thickness of the cermet and glass frit layers and upon the dimensions of the cermet circuit pattern. Optimum time and temperature are required to ensure that the cermet does not sink entirely into the glass frit layer leaving no conductive surface exposed. Optimization is also required to ensure that the cermet conductive surface does not protrude excessively above the surface of the glass frit surface.

In another aspect of the invention, it has been discovered that control of the "wet print thickness"—i.e., the thickness of the cermet ink film—can help prevent loss of adhesion of the material to the substrate. Controlling the wet print thickness, together with controlling the firing conditions, yields an optimum fired print thickness of the cermet layer. In accordance with this aspect of the invention, the wet print thickness can be monitored using a laser profilometer during application of the cermet film.

In a further feature of the invention, the substrate is a non-conductive ceramic material. It has also been found that the principles of this invention can be applied to a non-conductive substrate formed of a metal, such as stainless steel or a low carbon cold-rolled steel. Use of metal rather than ceramic decreases the overall cost of production for the thick film circuit element. Use of the metal substrate does not compromise the inventive process, but may necessitate the use of a different glass frit than for the ceramic substrate.

One benefit of the present invention is that it provides a process for producing thick-film circuit elements, such as a switch, that can be accurately controlled to ensure an optimum conductor layer. A further object and benefit is achieved by the inventive method in that the fired print thickness can be easily and accurately controlled, which ultimately reduces the wear and erosion of the circuit print and any contacts being drawn across the circuit print.

Another object and benefit is to provide a process that can be conducted with known material and known equipment. Other objects and benefits of the present invention will become apparent upon consideration of the following description and accompanying figures.

DESCRIPTION OF THE PREFERRED EMBODIMENT

Figure 1:
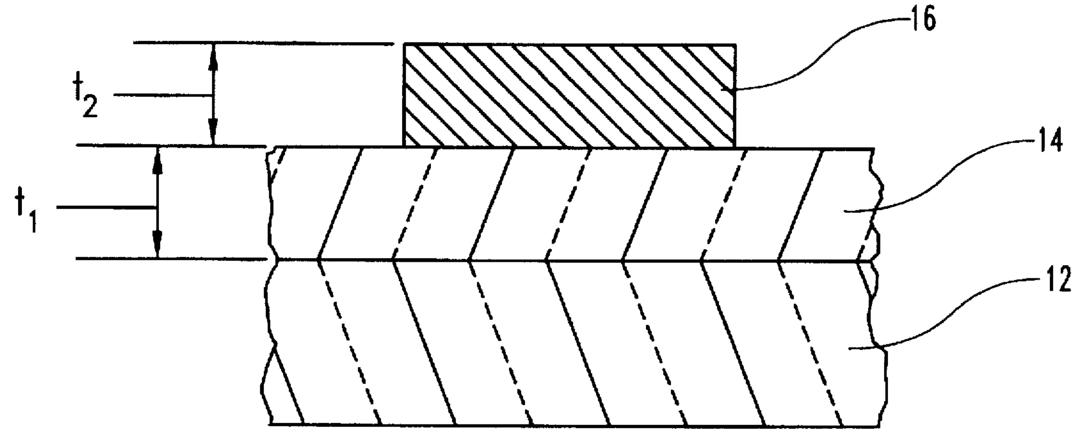
FIG. 1 shows a cross-sectional view of the thick-film circuit element of the present invention in one step of producing the circuit element.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As shown in FIG. 1, the thick-film switch element of the present invention includes a first layer 12 which constitutes, for example, a ceramic substrate. The substrate 12 can be any non-conductive material that is capable of withstanding the firing temperatures used in producing the switch element of the present invention, typically in the neighborhood of 1000° C. For instance, the substrate 12 can be a porcelain or an alumina material.

The second layer 14 is a high-temperature glass frit. The glass frit layer 14 preferably is composed of a glass matrix, such as lead silicate. The third component of the thick-film switch element of the present invention is a conductor layer 16 which is a low-temperature cermet. Preferably, the cermet layer 16 is comprised of a noble metal within a low-temperature glass matrix. The low temperature glass matrix for the cermet layer has a melting temperature below the softening temperature of the high temperature glass frit, preferably about 70–80% of the frit softening temperature. In the preferred embodiment, the glass frit has a melting temperature of at least 850° C. and a softening point temperature of at least 720° C. The glass matrix of the cermet layer 16 preferably has a melting temperature of approximately 500° C. and a softening temperature of about 365° C.

In the preferred embodiment, the high-temperature glass frit layer 14 is applied by conventional means to the ceramic substrate 12. For instance, the glass frit 14 can be in the form of a thick film paste which is silk screened onto the surface of the substrate 12. The high-temperature glass frit layer 14 is then introduced into a conventional furnace and fired in an air atmosphere at a temperature between the softening temperature and the melting temperature of the glass frit layer 14. The first firing temperature is slightly less than the melting temperature of the glass frit so that the layer 14 maintains its integrity while being fused to the substrate 12. In the preferred embodiment, the first firing temperature is at approximately 930° C.

In a further step of the process, the low-temperature cermet layer 16 is applied to the surface of the glass frit layer 14 in a pattern as depicted in FIG. 1. The cermet layer 16 can be applied by conventional techniques adapted to produce a circuit or electrical element pattern on the surface of the layer 14. For instance, the cermet layer 16 can be brushed, sprayed, or silk-screened onto the glass frit layer 14.

The first layer or the glass frit layer 14 is applied to a thickness $t_1$, while the low-temperature cermet layer 16 is applied at a thickness of $t_2$. In the preferred embodiment, these thicknesses are equal, that is $t_1=t_2$. In one specific embodiment, these layers both have a thickness of 0.001 inches.

Figure 2:
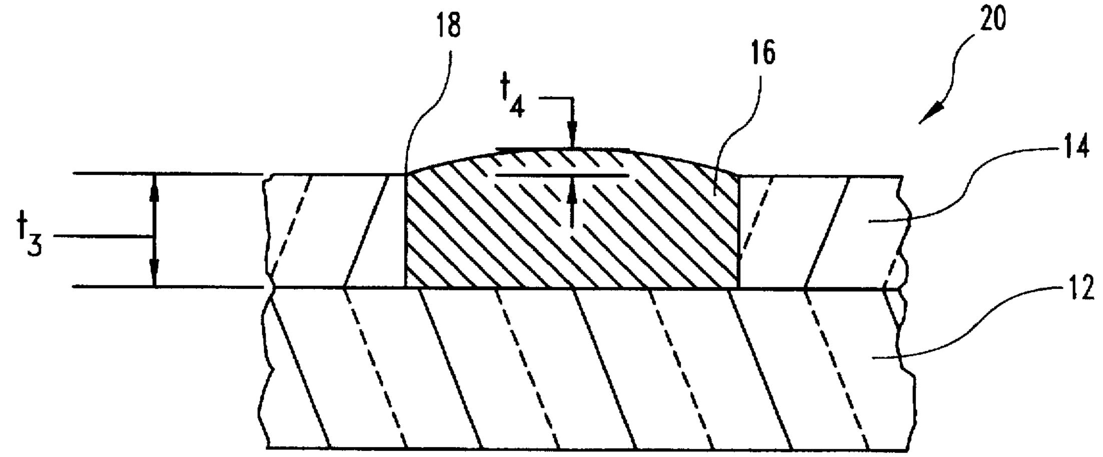
FIG. 2 is a side cross-sectional view of the component shown in FIG. 1 after processing is complete to produce the thick-film circuit element of the present invention.

After the cermet layer has been applied, the components of the thick-film switch element are again introduced into a conventional furnace and fired in the inert atmosphere at a temperature between the softening point of the glass matrix of the cermet layer 16 and the softening point of the glass frit layer 14. Preferably, the second firing occurs at a temperature near the melting point of the low temperature glass. It has been discovered that at this second firing temperature, the low temperature glass and metallic particles of the cermet layer 16 sink into the glass frit layer 14. The resulting product includes a cermet layer embedded within a glass frit layer, as depicted in FIG. 2. It has also been discovered that the thickness $t_3$ of the product is approximately equal to the original thickness $t_1$ of the glass frit layer 14 prior to the second firing. The length of time of the second firing determines how much the cermet layer sinks into the high temperature glass frit, and consequently how flush the cermet layer is relative to the glass frit layer. Proper control of the second firing can produce an exposed cermet conductor surface protruding a height $t_4$ of less than ten microns, and preferably between 4–8 microns, above the surface of the glass frit. An optimum cermet surface height $t_4$ above the glass frit surface is required to provide an adequate region for electrical contact while minimizing the wear or abrasion between the cermet joint and the wiper element.

Using the process of the present invention to form the thick-film switch element 20 shown in FIG. 2 results in a relatively smooth joint 18 between the conductive cermet layer 16 and the non-conductive glass frit layer 14. Proper firing can reduce the joint 18 to a four micron exposure above the glass frit surface. It has been found that the cermet is higher in the middle of the conductive layer than at the joints 18. For instance, a four micron protrusion at the joint 18 might accompany a six micron height at the middle of the conductive layer. Cermet protrusion in the 4–8 micron range provides an adequate electrical contact surface while reducing the wear between the conductive layer 16 and a wiper element passing repeatedly over the switch element 20.

In one specific example of the process of the present invention, the high-temperature glass frit 14 uses a boron silicate such as Product No. 3470 of Ferro Corp. The melting temperature of this specific glass frit is 850° C. and the softening point temperature is 720° C.

The low-temperature cermet layer 16 in the specific embodiment includes a palladium/silver alloy in a low temperature glass. In this specific embodiment, the alloy is in the ratio of 25% palladium and 75% silver. The glass matrix of the cermet in the specific embodiment has a melting temperature of 500° C. and a softening temperature of 375° C.

In the specific embodiment, the first firing occurs at 930° C. for approximately ½ hour under a conventional temperature profile in which the furnace is gradually increased and decreased to and from the peak temperature. The temperature is maintained at the peak firing temperature for between 5–10 minutes. The second firing occurs at a temperature of 625° C. through substantially the same firing profile. The initial thickness of the two layers is 0.001 inches for both layers. The thickness of the resulting conductive layer of the thick-film switch element product is 0.001 inches, with a six micron protrusion of the cermet from the surface of the glass frit layer.

It has been found that during the second firing the cermet layer tends to pull back toward the center of the conductor pattern as it sinks into the glass frit. Consequently, the conductor pattern is preferably slightly exaggerated or enlarged when it is first applied to the glass frit, at least when the conductor dimensions in the final switch element product are critical.

The firing times and temperatures are important to producing an optimum glass frit/cermet joint. Less than optimum firing conditions can result in a cermet layer that embedded below the surface of the glass frit, or one that protrudes too high above the surface. The firing conditions depend upon the temperature properties of the glass frit and cermets being used to produce the switch element, and upon the expected dimensions of the final product. While the disclosed embodiment includes glass frit and cermet layers of equal thickness, these initial thicknesses $t_1$ and $t_2$ need not be identical. For instance, if the cermet is thinner than the glass frit layer, the second firing time can be adjusted to optimize the amount that the cermet sinks into the high temperature glass.

The second firing temperature should not be so high as to exceed the melting temperature of the low temperature glass matrix of the cermet, although the temperature should be close to that melting temperature (and obviously above the softening temperature) so that the cermet layer is viscous enough to "melt" or "sink" into the glass frit layer. Similarly, the second firing temperature must be sufficiently close to the softening temperature of the high temperature glass frit layer so that the glass frit is soft enough to accept the cermet layer.

The method and thick-film circuit element set forth above is described in U.S. Pat. No. 5,169,465, to the present inventor. It has been discovered that further benefits of this novel technology can be obtained by controlling the "wet print thickness"—i.e., the thickness $t_2$ of the conductor layer 16 applied in a circuit pattern onto the glass frit layer 14. Controlling the wet print thickness $t_2$, coupled with the control of the firing conditions described above, allows optimization of the fired print thickness—i.e., the height $t_4$ of the conductor layer exposed above the glass frit.

Controlling the wet print thickness adds a further step to the process for producing the thick film circuit element of the invention. In particular, control of the wet print thickness occurs as the conductor layer 16 is initially applied to the glass frit layer 14. In the preferred embodiment, the conductor layer is a cermet paste that is silk screened onto the glass frit. As the cermet paste is applied, a laser profilometer is used to measure the thickness or height of the paste above the surface of the glass frit. Successive controlled applications of the cermet paste may be necessary until the desired controlled wet print thickness is attained.

In the specific embodiment, a wet print thickness for the cermet layer of 18–24 microns will lead to the preferred fired print thickness $t_4$ of 4–8 microns, with a fired print thickness of 4–6 microns being most preferred. This controlled wet print thickness will result in a fired print thickness that will prevent loss of adhesion of the cermet and glass frit layers to each other and to the non-conductive substrate 12.

In another improvement, the non-conductive layer 12 is formed of a metal, rather than the ceramic described above. It has been found that the inventive process for forming a thick film electrical element can be easily achieved with such a metal substrate, which can often reduce the cost of the element to one-third of the cost when a ceramic substrate is used. In one specific embodiment, the substrate is formed of series 304 stainless steel. Other similar non-conductive metals can be used, such as series 400 stainless steel and low carbon cold-rolled steel. As with the ceramic described above, the metal substrate is clearly capable of withstanding the firing temperatures called for by the inventive process, namely on the order of 1000° C.

Use of the stainless steel substrate in lieu of the ceramic substrate requires no modification of the process steps described above. However, it may be necessary to modify the glass frit layer 14 to a material formulated for use on metals. This glass material should retain the same temperature and viscosity characteristics of the glass used with a ceramic substrate. In one specific embodiment, a top coat porcelain sold by Ferro Corp as Product No. 1032XT, is used to form the glass frit layer 14.

The thick film circuit element technology of the present invention can be used in the production of switches or encoders, for instance, or for any other application requiring a nearly flat, smooth wiping or contact surface. Other thick film devices, such as resistors or hybrid circuits can be incorporated into the same package as the thick film switch or encoder mechanism using the process of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A process for producing a thick-film circuit element comprising the steps of:

applying a high-temperature glass frit layer to a surface of a ceramic substrate;

applying an electrically conductive cermet layer having a low-temperature glass matrix to the surface of the glass frit layer in a circuit element pattern;

measuring a cermet layer thickness above the surface of the glass frit layer;

adjusting the cermet layer thickness until the cermet layer thickness is substantially equal to a first predetermined thickness;

firing the cermet and the glass frit layers at a temperature sufficient to cause the cermet layer to sink into the glass frit layer;

controlling the temperature and duration at which the cermet and glass frit layers are fired to control the amount that the cermet layer sinks into the glass frit layer to a second predetermined thickness above the surface of the glass frit layer;

wherein a laser profilometer is used to measure the cermet layer thickness.

* * * * *